Oct. 16, 1934.     D. RHEE     1,977,207
METHOD AND MEANS FOR FINISHING AN ELASTIC FABRIC EDGE
Filed Jan. 20, 1934
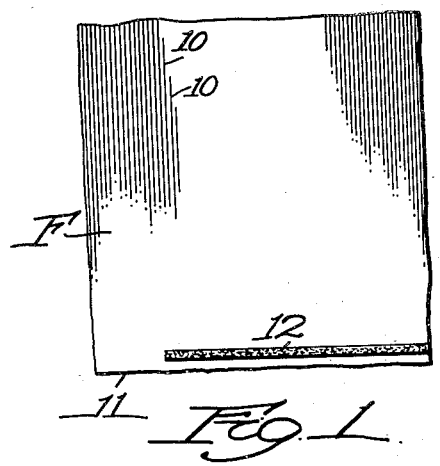
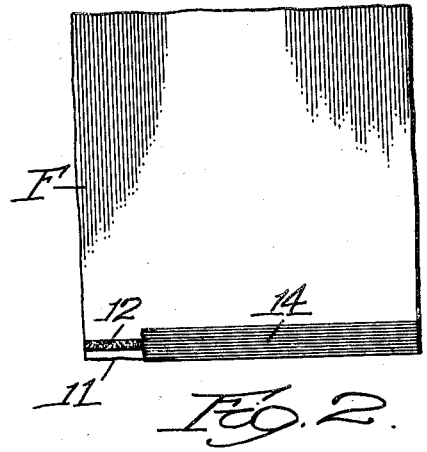
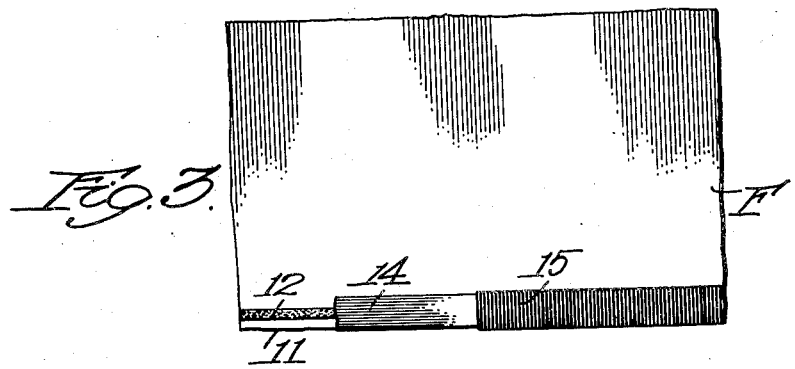
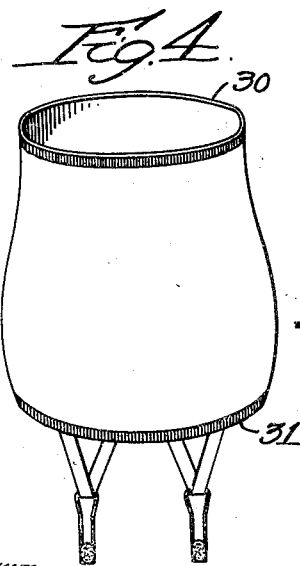
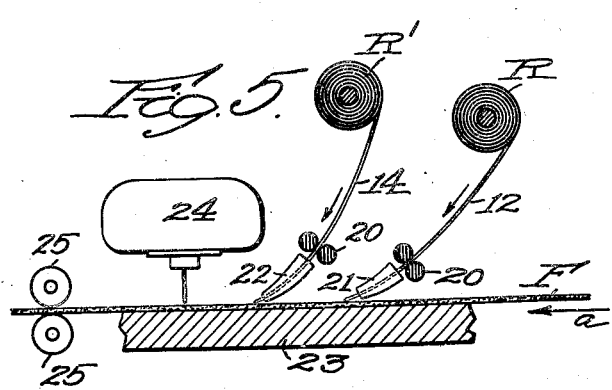

Patented Oct. 16, 1934

1,977,207

UNITED STATES PATENT OFFICE

1,977,207

METHOD AND MEANS FOR FINISHING AN ELASTIC FABRIC EDGE

Daniel Rhee, Bristol, R. I., assignor to Carr Manufacturing Corporation, Bristol, R. I., a corporation of Rhode Island Application January 20, 1934, Serial No. 707,554

7 Claims. (Cl. 154—2)

This invention relates to elastic fabric having rubber threads extending in at least one direction therethrough. In the manufacture of garments or other articles from such fabric, it is usually necessary to cut the fabric, thus leaving one or more unfinished cut edges. When such a cut is taken across a plurality of the rubber threads, these threads, which are under substantial tension, tend to contract and creep in the fabric. This causes the ends of the rubber threads to retreat from the edge of the fabric, producing an unsightly and objectionable appearance.

It is a general object of my present invention to provide improved means for securing the ends of the cut threads and for preventing endwise creeping thereof, the ends of the threads being firmly anchored at the edge of the fabric.

I have also devised an improved method or process by which this desirable result may be conveniently attained.

My invention further relates to arrangements and combinations of parts which will be hereinafter described and more particularly pointed out in the appended claims.

A preferred form of the invention is shown in the drawing, in which

Figs. 1, 2 and 3 are plan views of a portion of elastic fabric, showing successive steps in providing a finished edge therefor;

Fig. 4 is a perspective view of a garment showing the utility of my invention, and Fig. 5 is a diagrammatic view of mechanism by the aid of which my invention may be more conveniently practiced.

Referring to the drawing, I have shown a portion of elastic fabric F having rubber threads 10 extending in at least one direction therethrough. It will be understood that my invention is equally applicable to both one-way and two-way stretch elastic fabrics.

The rubber threads 10 may be bare rubber threads but are more commonly of the covered rubber type in which a fine rubber thread forms a core around which are placed one or more windings of suitable material such as cotton or silk, to produce an attractively covered thread.

Assuming that the fabric F has been cut along the line 11, transversely to a plurality of the rubber threads 10, I will now describe the method and means by which I prevent endwise creeping of the threads 10 away from the unfinished or cut edge 11.

In carrying out my invention, I first obtain a narrow strip 12 of unvulcanized sheet rubber, preferably containing, however, certain vulcanizing agents. This narrow strip 12 of rubber is applied to the fabric F near the unfinished or cut edge 11 thereof, after which a covering is placed over the strip 12. This covering is preferably in the form of a narrow elastic braid or tape 14, as indicated in Fig. 2, and is preferably somewhat wider than the rubber strip 12.

In the preferred manner of carrying out my invention, I then secure the tape 14 to the fabric F along the unfinished edge 11 by binding the tape 14 thereto by encircling stitches 15. This type of binding may be produced by special automatic sewing machines and not only secures the braid 14 in position but permits expansion and contraction thereof and also provides an attractive finish at the cut edge of the fabric.

I then apply heat and pressure to the parts assembled as above described, this heat being applied for a sufficient time and in sufficient degree to soften the rubber strip 12 and to cause it to penetrate the face of the fabric F and to adhere firmly to the threads 10 or to the windings thereon. Continued application of the heat also more or less fully vulcanizes the rubber strip 12, thus permanently securing the threads 10 and tape 14 against displacement at the edge of the fabric F.

After the edge of the fabric is thus treated and finished, the rubber threads 10 will be found to be firmly anchored at their ends adjacent the cut edge of the fabric, and all creeping or drawing away of the ends of the threads from the edge of the fabric is thus prevented.

It will be noted that my improved method and means for securing the ends of the rubber threads avoids the use of rubber cement, latex or other liquids which very easily spread beyond the edge of the tape 14 when heat and pressure is applied and thus disfigure the surface of the fabric.

In Fig. 5, I have indicated diagrammatically an arrangement of mechanism by which the rubber strip 12, tape 14 and binding stitches 15 may be economically applied. For this purpose I have provided a roll R of the rubber strip 12, a roll R' of tape 14, feed rolls 20, and guides 21 and 22. I have also provided a platform or support 23 and a machine 24 for inserting the binding stitches 15.

In carrying out my improved process with the use of such machinery, the fabric F is drawn through the machine in the direction of the arrow $a$, and the rubber strip 12 and tape 14 are successively and automatically applied, after which the binding stitches 15 are inserted, the whole operation being carried out as a continuous process.

The assembled parts may then be secured together by passing between heated rollers 25, if so desired, but more commonly the necessary heat and pressure is applied to the garment during the usual finishing operation, this being a necessary and usual step. A separate pressing and heating operation is thus avoided.

In Fig. 4 I have indicated a type of garment in which my invention is of particular value. Fig. 4 represents a corset or girdle formed of two-way stretch tubular elastic fabric which is woven continuously and which is thereafter cut into garment sections along the edges 30 and 31. These edges are thus without selvage and the elastic threads extending lengthwise of the garment are found to creep or draw away from these unfinished edges to such an extent as to injure the saleability of the garment, unless special and suitable provision is made for preventing such action.

By my improved process, the prevention of creeping is quickly and easily accomplished without disfiguring the delicate surface of the fabric, and without any substantial increase in cost over the usual finishing operations.

The term "vulcanizing" as used in the claims is to be understood to include substantial partial vulcanization as well as commercially complete vulcanization.

Having thus described my invention and the advantages thereof, I do not wish to be limited to the details herein disclosed, otherwise than as set forth in the claims, but what I claim is:—

1. The method of finishing a cut edge of elastic fabric containing rubber threads, which comprises applying to one face of said fabric adjacent said edge a narrow strip of unvulcanized sheet rubber, applying a piece of narrow elastic tape over said rubber strip, and applying heat and pressure to said assembled parts, thereby softening said rubber strip and causing said strip to adhere to said rubber threads and to said elastic tape.

2. The method of finishing a cut edge of elastic fabric containing rubber threads, which comprises applying to one face of said fabric adjacent said edge a narrow strip of unvulcanized sheet rubber containing vulcanizing agents, applying a piece of narrow elastic tape over said rubber strip, and applying heat and pressure to said assembled parts, thereby softening said rubber strip and vulcanizing the same and simultaneously causing said strip to adhere to said rubber threads and to said elastic tape.

3. The method of finishing a cut edge of elastic fabric containing rubber threads, which comprises applying to one face of said fabric adjacent said edge a narrow strip of unvulcanized sheet rubber, applying a covering of longitudinally elastic material to said strip of rubber, securing said covering from displacement, and applying heat and pressure to said assembled parts, thereby softening said rubber strip and causing said strip to adhere to said rubber threads and to said covering.

4. The method of finishing a cut edge of elastic fabric containing rubber threads, which comprises applying to one face of said fabric adjacent said edge a narrow strip of unvulcanized sheet rubber, applying a piece of narrow elastic tape over said rubber strip, binding said tape in position while at the same time leaving the tape free to expand and contract, and applying heat and pressure to said assembled parts, thereby softening said rubber strip and vulcanizing the same and simultaneously causing said strip to adhere to said rubber threads and to said elastic tape.

5. The method of finishing a cut edge of elastic fabric containing rubber threads, which comprises applying to one face of said fabric adjacent said edge a narrow strip of unvulcanized sheet rubber containing vulcanizing agents, applying a piece of narrow elastic tape over said rubber strip, binding said tape in position while at the same time leaving the tape free to expand and contract, and applying heat and pressure to said assembled parts, thereby softening said rubber strip and vulcanizing the same and simultaneously causing said strip to adhere to said rubber threads and to said elastic tape.

6. In an elastic fabric having a cut edge and having rubber threads severed at said edge, means to prevent creeping of said threads in said fabric comprising a narrow strip of sheet rubber vulcanized in place and firmly adhering to said rubber threads, a narrow elastic tape covering said strip and adhering thereto, and additional means to secure said tape in place while permitting expansion and contraction thereof.

7. In an elastic fabric having a cut edge and having rubber threads severed at said edge, means to prevent creeping of said threads in said fabric comprising a narrow strip of sheet rubber vulcanized in place and firmly adhering to said rubber threads, a narrow elastic tape covering said strip and adhering thereto, and a series of binding stitches encircling said tape and securing said tape in place while permitting expansion and contraction thereof.

DANIEL RHEE.